(12) United States Patent
Roehrig et al.

(10) Patent No.: US 9,569,246 B2
(45) Date of Patent: Feb. 14, 2017

(54) METHOD AND SYSTEM FOR MIGRATION OF PROCESSES IN HETEROGENEOUS COMPUTING ENVIRONMENTS

(71) Applicant: INTERNATIONAL BUSINESS MACHINES CORPORATION, Armonk, NY (US)

(72) Inventors: Jochen Roehrig, Boeblingen (DE); Wolfgang Reichert, Boeblingen (DE); Ulrich Weigand, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/648,939

(22) PCT Filed: Oct. 18, 2013

(86) PCT No.: PCT/IB2013/059438
§ 371 (c)(1),
(2) Date: Jun. 2, 2015

(87) PCT Pub. No.: WO2014/087268
PCT Pub. Date: Jun. 12, 2014

(65) Prior Publication Data
US 2015/0301848 A1    Oct. 22, 2015

(30) Foreign Application Priority Data
Dec. 3, 2012  (GB) .................................. 1221700.6

(51) Int. Cl.
*G06F 9/455* (2006.01)
*G06F 9/48* (2006.01)
*H04L 29/08* (2006.01)

(52) U.S. Cl.
CPC ......... *G06F 9/45558* (2013.01); *G06F 9/4552* (2013.01); *G06F 9/45508* (2013.01);
(Continued)

(58) Field of Classification Search
CPC .. G06F 9/4856; G06F 9/45508; G06F 9/4552; G06F 9/45558
(Continued)

(56) References Cited

U.S. PATENT DOCUMENTS

| | | | |
|---|---|---|---|
| 7,334,235 B2 * | 2/2008 | Hunt | G06F 9/465 718/104 |
| 7,484,208 B1 * | 1/2009 | Nelson | G06F 9/45558 718/1 |

(Continued)

FOREIGN PATENT DOCUMENTS

| | | |
|---|---|---|
| JP | 2004-231114 A | 8/2004 |
| WO | 2011134836 A1 | 11/2011 |
| WO | WO 2011/134836 | 11/2011 |

OTHER PUBLICATIONS

Groesbrink, "A First Step towards Real-Time Virtual Machine Migration in Heterogeneous Multi-Processor Systems", 2012, Proceedings of the 1st Joint Symposium on System-Integrated Intelligence.*

(Continued)

*Primary Examiner* — Wei Zhen
*Assistant Examiner* — Junchun Wu
(74) *Attorney, Agent, or Firm* — William A. Kinnaman, Esq.; Kevin P. Radigan, Esq.; Heslin Rothenberg Farley & Mesiti P.C.

(57) ABSTRACT

Migrating a process from a source system with a source operating system to a target system with a target operating system is provided, where the source and target systems or source and target operating system are incompatible. The (Continued)

migrating includes: employing an emulator at the target system to execute code associated with the process being migrated, the emulator performing: translating of system calls and runtime library calls for the source operating system to calls of the target operating system using a system call translator and runtime library translator; translating source application code associated with the process into binary target application code executable on the target system, using a compiler where the source application code has not been translated; and executing the translated binary target application code on the target system, and discontinuing emulation of the process at the target system once the executing begins.

20 Claims, 3 Drawing Sheets

(52) U.S. Cl.
CPC ........ G06F 9/4856 (2013.01); H04L 67/1095 (2013.01); *G06F 2009/4557* (2013.01)

(58) Field of Classification Search
USPC .......................................................... 718/1
See application file for complete search history.

(56) References Cited

U.S. PATENT DOCUMENTS

| | | | |
|---|---|---|---|
| 8,407,702 B2 | 3/2013 | Ikegaya et al. | |
| 8,438,256 B2* | 5/2013 | Rogel ................. | G06F 9/45533 709/223 |
| 2004/0194070 A1 | 9/2004 | Baraz | |
| 2004/0243986 A1* | 12/2004 | Nishiyama .......... | G06F 9/45508 717/139 |
| 2005/0055402 A1 | 3/2005 | Sato | |
| 2009/0077261 A1 | 3/2009 | Broadhurst | |
| 2009/0222798 A1* | 9/2009 | Iguchi ....................... | G06F 8/52 717/137 |
| 2010/0306769 A1* | 12/2010 | Schneider ........... | G06F 9/45533 718/1 |
| 2011/0113426 A1 | 5/2011 | Kung et al. | |
| 2011/0265084 A1* | 10/2011 | Knowles ................. | G06F 9/461 718/1 |
| 2012/0137278 A1* | 5/2012 | Draper ...................... | G06F 8/65 717/170 |
| 2012/0296626 A1* | 11/2012 | Bond ................... | G06F 9/45545 703/26 |
| 2012/0297163 A1* | 11/2012 | Breternitz ............. | G06F 9/5066 712/22 |
| 2013/0054734 A1* | 2/2013 | Bond .................... | G06F 9/4856 709/217 |
| 2013/0268643 A1* | 10/2013 | Chang ................. | G06F 9/45558 709/223 |
| 2016/0026488 A1* | 1/2016 | Bond .................. | G06F 9/45545 718/1 |

OTHER PUBLICATIONS

Boyd et al. "Process Migration: A Generalized Approach Using a Virtualizing Operating System", 2002, Distributed Computing Systems.*
Bishop et al. "Process Migration for Heterogeneous Distributed Systems", Aug. 1995, Dartmouth College.*
Petrot et al. "On MPSoC Software Execution at the Transaction Level", Jul. 2011, IEEE.*
International Search Report for PCT/IB2013/059438 dated Apr. 18, 2014.
Great Britain Search Report for GB1221700.6 dated Jun. 13, 2013.
Zheng, et al; "PA-RISC to IA-64: Transparent Execution, No Recompilation," IEEE Computer Society Press, Mar. 2000, pp. 47-52, vol. 33, Issue 3, Los Alamitos, California, USA.
Jiang, et al; "Process/Thread migration and checkpointing in heterogeneous distributed systems," Proceedings of the 37th Annual Hawaii International Conference on System Sciences, Jan. 2004, pp. 282-291, Piscataway, New Jersey, USA.
K. Suzaki et al., "Current Implementation of Network Transferable Computer", The Institute of Electronics, Information and Communication Engineers, vol. 100, No. 86 (May 18, 2000) (13 pages). (English Abstract Only.).

* cited by examiner

METHOD AND SYSTEM FOR MIGRATION OF PROCESSES IN HETEROGENEOUS COMPUTING ENVIRONMENTS

FIELD OF THE INVENTION

The present invention relates generally to the field of migration of processes. More specifically, the present invention relates to a method and system for migration of processes in a heterogeneous computing environment, i.e. from a source operating system on a source hardware system to a target operating on a target hardware system, where, for instance, the source and target operating systems are different types of operating systems and/or source and target hardware are different types of systems.

BACKGROUND

It is well-known technology to interconnect computer systems using different hardware and different operating systems by using standardized network interfaces. Especially cloud environments may comprise manifold server machine architectures and operating systems (heterogeneous cloud environments).

Such server machines need to undergo regular maintenance or face other outages leading to server downtimes. To avoid this problem, some server machines offer zero downtime migration of virtual servers to another server machine. However, these solutions always require the target machine to be of the same architecture as the source machine.

In a heterogeneous cloud environment, at a point of time when a zero downtime migration must be carried out, no server machine of the same architecture as the source server machine may be available whereas a server machine of a different architecture, different architecture level or different hardware features installed may be available.

Therefore, it would be advantageous to have a mechanism for carrying out migration of applications in a heterogeneous cloud scenario where migrated applications perform natively or nearly natively on the target machine, thus offering the most possible flexibility.

Migration in the context of the invention may relate to live migration or non-live migration. Live migration means migrating a running process without interruptions. Non-live migration means that a running process is suspended on a source system, the state of the process is saved on the source system, the state of the process is transferred from the source system to a target system. After transferring the state of the process, the process is terminated on the source system and restarted on the target system.

SUMMARY OF THE INVENTION

In one aspect, a computer-implemented method for migrating of at least one process from a source system with a source operating system to a target system with a target operating system is provided. The source and target system or the source and target operating system are different types of systems or operating systems, respectively. The method includes: starting migration of the at least one process using, at least in part, a target virtualization and migration component of the target system; allocating virtual address space in the target system for the at least one process being migrated; storing memory of virtual address space of the at least one process being migrated to the allocated virtual address space of the target system; storing information regarding operating system state associated with the at least one process to the target operating system; and executing the at least one process being migrated on the target system by means of an emulator adapted to emulate the source system, wherein the emulator starts executing source application code associated with the at least one process, and performs or initiates: translating, at the target system, system calls and runtime library calls of the source operating system associated with the at least one process to system calls for the target operating system, by means of a system call translator, and runtime library calls for the target system, by means of a runtime library translator; translating, at the target system, the source application code associated with the at least one process being migrated into binary target application code executable on the target system by means of a compiler if the source application code has not yet being translated; and executing the translated binary target application code on the target system.

In another aspect, a computer-based system for migrating at least one process from a source system with a source operating system to a target system with a target operating system is provided, where the source and target system or the source and target operating system are different types of systems or operating systems, respectively. The target system includes, at least in part, the computer-based system, including: a target virtualization and migration component which is compatible to a source virtualization and migration component of the source system and which receives migration trigger information; an emulator which emulates the source system using the target system; a compiler to translate source application code associated with the at least one process for executing on the source system, to binary target application code executable on the target system; a system call translator for translating system calls of the source operating system and to system calls of the target operating system; and a runtime library translator for translating calls of the runtime libraries of the source operating system into calls of the runtime libraries of the target operating system. The computer-based system: migrates the at least one process from the source system using, at least in part, the target virtualization and migration component; allocates virtual address space in the target system for the at least one process being migrated; stores memory of virtual address space associated with the at least one process being migrated to the allocated virtual address space of the target system; stores information regarding operating system state associated with the at least one process to the target operating system state; and executes the at least one process being migrated on the target operating system by means of the emulator, wherein the emulator starts executing source application code associated with the at least one process, and performs or initiates: translating, at the target system, system calls and runtime library calls of the source operating system associated with the at least one process to system calls for the target operating system, by means of the system call translator and runtime library calls for the target operating system, by means of the runtime library translator; translating, at the target system, the source application code associated with the at least one process being migrated into binary target application code executable on the target system by means of the compiler if the source application code has not yet been translated; and executing the translated binary target application code on the target system.

In a further aspect, a computer program product for migrating at least one process from a source system with a source operating system to a target system with a target operating system is provided, where at least one of the source and target system or the source and target operating system are different types of systems or operating systems, respectively. The computer program product includes a computer-readable storage medium readable by a processor and storing instructions for execution by the processor for performing a method, which includes: starting migration of the at least one process using, at least in part, a target virtualization and migration component of the target system; allocating virtual address space in the target system for the at least one process being migrated; storing memory of virtual address space of the at least one process being migrated to the allocated virtual address space of the target system; storing information regarding operating system state associated with the at least one process to the target operating system; and executing the at least one process being migrated on the target operating system by means of an emulator adapted to emulate the source system, wherein the emulator starts executing source application code associated with the at least one process, and performs or initiates: translating, at the target system, system calls and runtime library calls of the source operating system associated with the at least one process to system calls for the target system, by means of a system call translator, and runtime library calls for the target operating system, by means of a runtime library translator; translating, at the target system, the source application code associated with the at least one process being migrated into binary target application code executable on the target system by means of a compiler if the source application code has not yet being translated; and executing the translated binary target application code on the target system.

BRIEF DESCRIPTION OF THE DRAWINGS

In the following, certain embodiments of the invention are described in greater detail by way of example, and making reference to the drawings in which.

DETAILED DESCRIPTION

Figure 1:
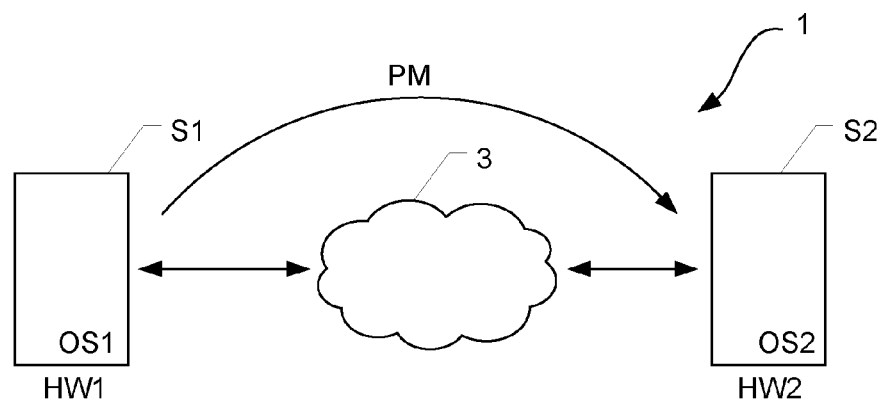
FIG. 1 shows a schematic architecture of a computing environment, to employ one or more aspects of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodies therein, for example, in baseband or as part of a carrier wave. Such a propagated signal may take any of a variety of forms, including, but not limited to, electromagnetic, optical, or any other suitable combination thereof. A computer readable signal medium may be a computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented program language such as Java, Smalltalk, C++ or the like and conventional procedural programming languages, such as the "C" programming language or similar programming languages. The program code may execute entirely on the user's computer, partly on the user's computer or entirely on the remote computer or server. In the latter scenario, the remote computer may be connected to the user's computer through any type of network, including local area network (LAN) or a wide area network (WAN), or the connection may be made to an external computer (for example, through the Internet using an Internet Service Provider).

Referring to FIG. 1, a conventional architecture of a computing environment 1 is shown. For example, two computing systems S1, S2 are coupled via a network connection 3 to enable the computing systems S1, S2 to communicate with each other. The computing environment is a heterogeneous environment, i.e. the hardware HW1 of the system S1 is different to the hardware HW2 of system S2. In addition, the computing systems S1, S2 may comprise a different operating system, i.e. system 1 comprises a first operating system OS1 and system 2 comprises a second operating system OS2, wherein operating systems OS1 and OS2 are different. The computing systems S1, S2 maybe dedicated servers or virtual servers which may run on top of a virtual machine monitor, also called hypervisor. In the following, at least one process PM is migrated from computing system S1 to computing system S2, i.e. computing systems S1 is the source system and computing system S2 is the target system with respect to the migration.

Note that one may employ an emulator of the source system or machine on the target system or machine to migrate to a different hardware/architecture. However, emulation of codes suffers from low overall performance. Further, with emulation, one is bound to migration of a complete virtual server in such a scenario, that is, it is not possible to move different applications running on a source machine to different target machines.

Figure 2:
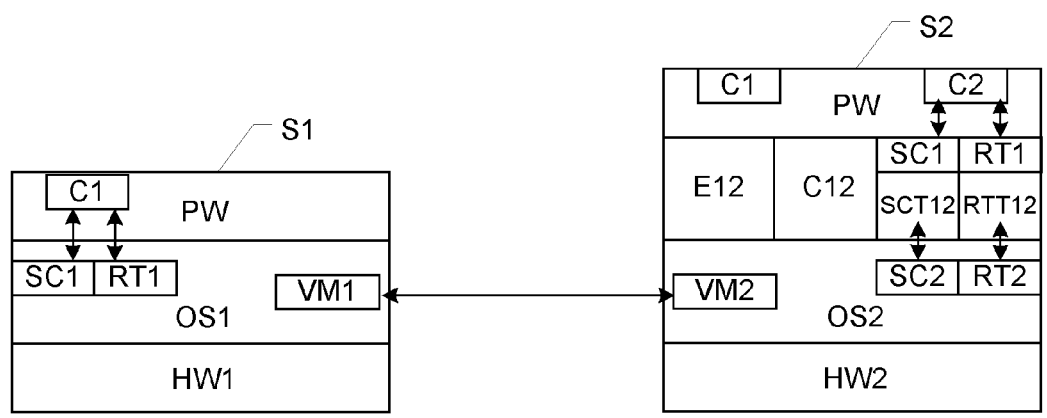
FIG. 2 shows a schematic structure of a source system and target system, in accordance with one or more aspects of the present invention.

FIG. 2 shows the source system S1 and the target system S2 in more detail. The source system S1 comprises hardware HW1 with a certain hardware architecture. The operating system OS1 of the source system S1 comprises a virtualization and migration component VM1, a system call interface SC1 and a runtime library interface RT1. The virtualization and migration component VM1 preferably is located within the operating system OS1. It is adapted to initiate and carry out the migration of a process PM to be migrated from source system S1 to target system S2. In other words, the virtualization and migration component VM1 builds the migration interface of source system S1. The system call interface SC1 is an interface for handling system calls initiated by the process PM. Via system call interface SC1 a process is able to request a service from an operating system's kernel. This may include hardware related services (e.g. accessing the hard disk), creating and executing new processes, and communicating with integral kernel services (like scheduling). Said runtime library interface RT1 handles library calls initiated by the process PM. Library calls are a well-known mean in computer technology for reducing application code by abstracting system calls.

A process PM or a group of processes to be migrated are running on source system S1. The process PM is associated with the compiled source application code C1, i.e. the binary machine code which can only run on hardware HW1 of the source system S1 and not on target system S2. The compiled source application code C1 is able to initiate system calls via system call interface SC1 of operating system OS1 and library calls via runtime library interface RT1.

In addition, the target system S2 comprises hardware HW2 with certain hardware architecture which may be different to hardware HW1. The operating system OS2 of the target system S2 comprises a virtualization and migration component VM2, a system call interface SC2 and a runtime library interface RT2. The virtualization and migration component VM2 preferably is located within the operating system OS2. It is compatible to the virtualization and migration component VM1 of source system S1, i.e. virtualization and migration component VM2 is adapted to act as a migration target for process PM whose migration was initiated by virtualization and migration component VM1. In other words, the virtualization and migration component VM2 builds the counter piece of virtualization and migration component VM1 to enable a migration of process between source system S1 and target system S2.

The system call interface SC2 is an interface for handling system calls directed to operating system OS2. Said runtime library interface RT2 handles library calls directed to operating system OS2.

Furthermore, the target system S2 comprises an emulator E12 which is adapted to emulate the hardware HW1 of source system S1 on target system S2. Within the emulator E12 it is possible to run process PM on target system S2 in emulation mode, i.e. the functionality of the source system S1 is reproduced within the target system S2 to enable process PM to be executed on target system S2.

The target system S2 further comprises a compiler C12 which is adapted to translate source application code C1 which can be executed on the source system S1 to target application code C2 adapted to be executed directly on the target system S2. Preferably the compiler C12 is a dynamic just-in-time compiler which is able to compile code at runtime. Preferably it is possible to compile the source application code C1 on demand when the emulator E12 encounters an application code passage of source application code C1 to be compiled during execution of the process in emulation mode on the target system S2.

For translating system calls directed to the source operating system OS1 into calls directed to the target operating system OS2, the target system S2 comprises a system call translator SCT12. The system call translator SCT12 is adapted to receive a system call directed to the source operating system OS1 and translate it to a system call which can be handled or processed by the target operating system OS2. Preferably the system call translator SCT12 provides a system call interface SC1 to receive system calls directed to the source operating system OS1 and an interface to transmit the translated system call to system call interface SC2 provided by the operation system OS2. Thereby it is possible to transform system calls generated by source application code C1 or target application code C2 and addressed to the operating system OS1 in native system calls for operating system OS2.

In addition, the target system S2 comprises a runtime library translator RTT12. The runtime library translator RTT12 is adapted to receive a library call directed to the runtime libraries of source operating system OS1 and translate it to a library call which can be handled or processed by the target operating system OS2 and which is directed to the runtime libraries of target operating system OS2. Preferably the runtime library translator RTT12 provides a runtime library interface RT1 to receive library calls directed to the source operating system OS1 and an interface to transmit the translated library calls to runtime library interface RT2 provided by the operation system OS2. Thereby it is possible to transform library calls generated by source application code C1 or target application code C2 and addressed to the runtime libraries of the operating system OS1 in native library calls for operating system OS2.

Figure 3:
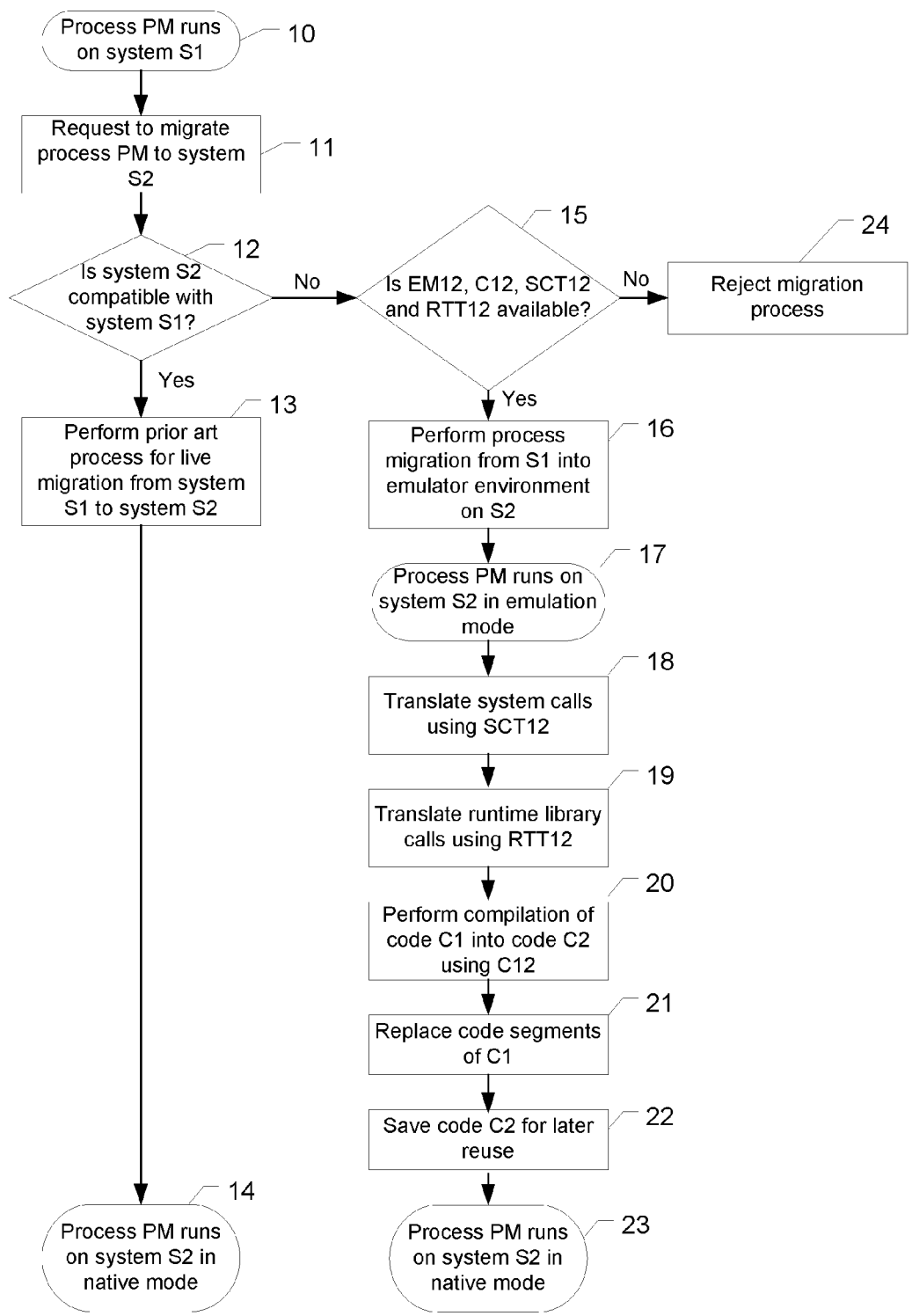
FIG. 3 shows a schematic flowchart of a migration process according to one or more aspects of the present invention.

In the following, an exemplary migration of a process PM from source system S1 to target system S2 is explained by means of FIG. 3. At the beginning of the migration process, the process PM to be migrated is running on source system S1 (10). If a migration of the process PM running on source system S1 to target system S2 is requested (11), there is a check, whether target system S2 is compatible to source system S1, i.e. that the target system S2 comprises the same operating system OS2 and hardware HW2 as the source system S1 (12).

If the target system S2 is compatible with the source system S1, a standard process migration from source system S1 to target system S2 is performed (13). This process is well-known by a person skilled in the art. For example, the memory and other process parameters associated with the process to be migrated are copied to the target system S2. After migration, the process PM is started and may run in native mode (14), i.e. using the same binary application code, system calls, runtime library calls etc. as while running on source system S1.

If the decision regarding the compatibility is negative (12), i.e. target system S2 is incompatible with the source system S1, it is investigated if an emulator E12, a system call translator SCT12, a runtime library translator RTT12 and a compiler C12 are available on target system S2, wherein the emulator E12, the system call translator SCT12, the runtime library translator RTT12 and compiler C12 have to be compatible to perform upper mentioned emulation and translation tasks with respect to the hardware HW1, HW2 and operating systems OS1, OS2 of the systems S1, S2 involved in process migration (15).

If a compatible emulator E12, a system call translator SCT12, a runtime library translator RTT12 and a compiler C12 are available on target system S2, the process PM is migrated into the emulator environment of emulator E12 on target system S2 (16). The migration is carried out by interacting of the virtualization and migration components VM1, VM2. When migrating process PM from virtualization and migration component VM1 to virtualization and migration component VM2 the memory of the virtual address space of process PM is copied to operating system OS2. Furthermore, the operating system state associated with process PM is copied to operating system OS2. The operating system state comprises local resources and global resources. Local resources, for example, are the page table setup, file descriptors, System V IPC resources (semaphores, shared memory areas, queues etc.), process identifiers, etc. Global resources, for example, are open network connections, network shares, etc.

After said copying is finished, the execution of process PM is started on target system S2 by means of the emulator EM 12, i.e. in emulation mode (17). During execution of process PM by emulating source system S1 on target system S2, the process PM initiates system calls and runtime library calls adapted to operating system OS1. The system call translator SCT12 replaces or translates system calls directed to operating system OS1 into native system calls directed to operating system OS2, so after replacement or translation, the system calls originally addressed to operating system OS1 can be handled by operating system OS2 (18). Similarly, the runtime library translator RTT12 replaces or translates runtime library calls directed to operating system OS1 into native runtime library calls directed to operating system OS2 (19).

For translating source application code C1 into target application code C2, which finally can be executed by the operating system OS2, the emulator EM 12 triggers the compiler C12 to perform the code translation (20). The compiler C12 receives the source application code C1 and translates it into target application code C2, which can be natively executed on target system S2, i.e. target application code C2 is a native binary code adapted to target system S2. Preferably the compiler C12 may be intelligent to recognize which parts of the source application code C1 have already been translated in prior translation steps. Those already translated parts are reapplied and only the remaining parts which were not translated previously are translated. Furthermore, the compiler C12 may be a dynamic just-in-time compiler, i.e. the source application code C1 is translated to target application code C2 while source application code C1 is executed by the emulator EM12. In addition, the compiler may perform the translation of source application code C1 on demand, i.e. the translation is executed incrementally when the emulator EM12 uses a certain passage of source application code C1 which was not compiled to target application code C2 in the past. Thereby the code segments of source application code C1 are dynamically replaced by code segments of target application code C2 (21). Preferably, the target application code C2 is saved temporarily within target system S2.

After complete compilation of source application code C1 into target application code C2, the resulting target application code C2 is stored into a persistent repository, i.e. non-volatile storage means of the target system S2 (22). Thereby the target application code C2 could be reused for example by additionally migrating the content of the persistent repository while performing the previously described migration process from virtualization and migration component VM1 to virtualization and migration component VM2. A further advantage of storing the target application code C2 persistently on target system S2 is that it can be reused after a restart of target system S2, i.e. system resources for emulating source system S1 and recompiling the source application code C1 into target application code C2 may be saved.

Finally, performing process PM in emulation mode is stopped and the process PM executes the native binary code appropriate for HW2 while using previously generated target application code C2 (23). It may be necessary to continue performing system call translation and runtime library call translation.

If the investigation step (15) determining the availability of an emulator E12, a system call translator SCT12, a runtime library translator RTT12 and compiler C12 on target system S2 results in a negative result, the migration from source system S1 to target system S2 may be rejected (24). Preferably, before rejection there is an intermediate investigation step for determining if migration from source system S1 to target system S2 is possible by stacking of translation and emulation processes. In heterogeneous computing environments, emulators, compilers, system call translators and/or runtime library call translators may not exist for every possible combination of source and target system S1, S2.

Figure 4:
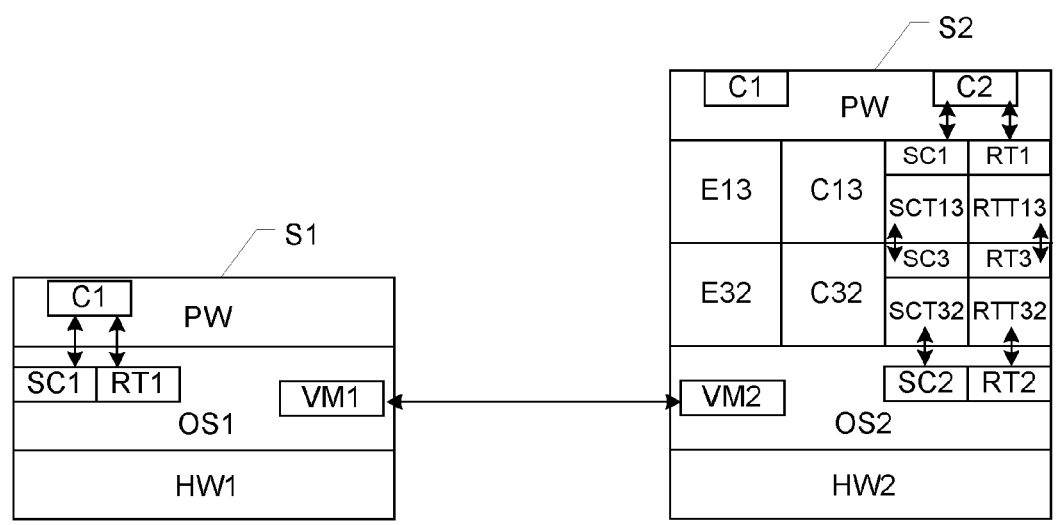
FIG. 4 shows a schematic structure of the source and target system using stacking of translation and emulation entities, in accordance with one or more aspects of the present invention.

To enable the migration to non-supported operating system OS2 and/or hardware HW2, the respective existing translation and emulation processes may be stacked such that the resulting processing stack allows for execution of the desired source application code C1 on any operating system OS2 and/or hardware HW2. For example, running a Windows/Intel process PM on an AIX system could be achieved by process PM on top of a Linux/Intel system call and runtime library call translator, translating the Intel code to Linux on Power code by means of an Intel to Power emulator and just-in-time-compiler and running the resulting code on top of a Linux on Power to AIX translator. In other words, if compiler C12, system call translator SCT12 and/or runtime library translator RTT12 are not available, but compiler C13, system call translator SCT13 and runtime library translator RTT13 for migrating a process from source system 1 to a third system as well as compiler C32, system call translator SCT32 and runtime library translator RTT32 for migrating a process from the third system to target system 2 are available this stacking can be used to perform a migration from source system 1 to target system 2 (FIG. 4).

For migration of the process PM it is necessary to transfer the operating system state associated with process PM to operating system OS2. The operating system state comprises the page table setup, file descriptors, system V IPC resources (semaphores, shared memory areas, queues etc.), process identifiers, etc. The operating system state may not be changed during the migration process. This means that the operating system state must be exactly the same in the context of operating system OS2 while performing emulation of source system S1 on target system S2—otherwise the emulation process could not be executed correctly on operating system OS2. There may be at least two different possibilities to provide operating system state associated with the process to be migrated on target system S2:

The first possibility is to pre-allocate operating system state in the context of operating system OS2. At the beginning of the migration, operating system OS2 first allocates all resources for operating system state in the context of operating system OS2 before starting the emulator. When the emulation of the process PM to be migrated starts, it uses the pre-allocated resources for the emulated process and the remaining resources in the context of operating system OS2 for execution of the actual emulator process.

A second possibility is to place resources regarding the operating system state anywhere in the context of operating system OS2. To enable the access to the information regarding the operating system state dynamically mapping is done to the real information regarding the operating system. In this case the emulation on target system S2 can be started before allocating operating system state in the context of operating system OS2, but the over-all migration performance may be lower because of the additional computational effort because of the mapping.

In one or more embodiments of the invention, there may be a central repository for persistently saving uniquely identifiable code parts. All systems that may be involved in a migration process may have access to the central repository. Especially, the central repository may be arranged within a cloud environment. The emulator or the compiler which transforms the binary application code may submit the compilation result to the central repository for persistently saving it. If an emulator or a compiler of a system involved in migration process has to compile source application code C1 to target application code C2, the emulator or compiler may initiate an access to the central repository for investigating, if the code or part of code to be compiled may have already been compiled in the past and is therefore available on the central repository. If so, the emulator or compiler may fetch and reuse the already compiled code or part of code.

Especially in computing environments with a large amount of computing entities, there may be at least one compiling entity for translating application code adapted for a source operating system OS1 and/or hardware HW1 to a binary application code adapted for a source operating system OS2 and/or hardware HW2. The compiling entity may be adapted for highly parallel and fast compiling of codes. It may receive a compiling task from an emulator, perform the requested compiling and send the compiled code back to the requesting emulator. In addition or alternatively, the compiled code may be sent to the central repository.

The compiling of code may be performed while using intermediate code techniques. The compiler may produce a standardized intermediate language code in addition to the binary application code for compiling. While adding the intermediate language code the dynamic recompilation is simplified and may produce better optimized binary code for the target system and allows elimination of system call and runtime library call translation as further aspect of the recompilation. For example, the intermediate language code and the associated binary application code may be stored together in the central repository. Dependent on the operating system and hardware configuration of the systems involved in the migration process the compilation can be done based on an intermediate language code or an already compiled binary code may be chosen.

In addition, a checking entity may be employed within the target system or within the computing environment as a common entity. The checking entity may compare the semantics of execution of binary code which was running on the source system S1 before migration with the semantics of execution of translated binary code after migration on the target system S2. The goal of implementing the checking entity is to find out, if there was a failure in compiling the source application code C1 in target application code C2. If a difference between the respective semantics is assessed, the migration attempt may be rejected to avoid an error situation.

Note that it is an objective of embodiments of the invention to provide for an improved computer-implemented method, computer-readable medium and system for migrating a process in a heterogeneous computing environment. The objective is solved by the features of the independent claims. Enhanced embodiments are given in the dependent claims. If not explicitly indicated otherwise, embodiments of the invention can be freely combined with each other.

In one aspect, the invention relates to a computer-implemented method for migrating of at least one process from a source system with a source operating system to a target system with a target operating system, wherein said source and target system and said source or target operating system are different, wherein the target system comprises:
  a target virtualization and migration component which is compatible to a source virtualization and migration component of the source system and which is adapted to receive migration trigger information sent by the source virtualization and migration component;
  an emulator which is adapted to emulate the source system by using the target system;
  a compiler which is adapted to translate source application code associated with a process executed on source system to binary target application code which is executable on the target system;
  a system call translator for translating system calls directed to the source operating system into system calls directed to the target operating system;
  a runtime library translator for translating calls directed to the runtime libraries of the source operating system into calls directed to the runtime libraries of the target operating system;
wherein the method comprises the following steps:
  starting a migration of the at least one process by using said source and target virtualization and migration component;
  allocating virtual address space in the target system for said process to be migrated;
  copying the memory of virtual address space of the process to be migrated to said allocated virtual address space of said target system;
  copying information regarding operating system state which is associated with said process to the target operating system;
  executing the process to be migrated on said target operating system by means of said emulator, wherein said emulator starts executing the code associated with said process and performs or initiates the following steps:
    translating system calls and runtime library calls for source operating system associated with said process in system calls for said target operating system by means of said system call translator and in runtime library calls for said target operating system by means of said runtime library translator;
    translating said source application code associated with the process to be migrated into binary target application code executable on said target system by means of said compiler, if said source application code has not yet been translated; and
    start executing said translated binary target application code on said target system.

Therefore, the method enables a process to be migrated from source system to target system even with zero downtime, i.e. there is a live migration of the process between two different operating system/hardware combinations. Thus, the processes of a server to be temporarily shut-down can be distributed to different target systems. Thereby the invention suggests a two stages in migration, namely first the emulation of the source system on target system to enable the immediate execution of the migrated process on source system. To increase the performance, in a second stage the source application code will be translated to target application code, which can be executed natively on the target system. After translation the emulation process may be stopped to save computational resources.

According to certain embodiments of the invention, the steps of translating system calls and runtime library calls and translating said source application code are performed on demand. After starting the emulation of the process to be translated within the target system, the source application code is translated step by step. For example, if a source code passage is executed within the emulator and the source code passage was not translated previously, the source code passage will be translated instantly. Similarly, if system calls or runtime library calls arise which were not translated in the past, those system calls will be translated promptly after their usage.

According to one or more embodiments of the invention, the compiler is a just-in-time compiler. By using just-in-time-compilation, also called dynamic compilation, the machine-readable binary target code is generated at runtime, i.e. the code is compiled when it is about to be executed. Thereby, the input for the just-in time-compiler may be an intermediate code or a machine-readable binary code which is modified by the just-in time-compiler. Just-in-time-compilation increases the performance of migrating the process.

According to certain embodiments of the invention, the source application code to be compiled by the compiler is binary machine code, a combination of binary machine code and intermediate code or an intermediated code. Intermediate code is an abstract, compiler internal representation of the program source code after it has been parsed and a lexical and semantic analysis has been performed. When using binary machine code the code to be executed by the emulator may be directly used to generate the binary target code, i.e. the same binary code is used by the emulator as well as for the compiler. In contrary, using an intermediate code enables the compiler to recompile and optimize the program based on the abstract representation of the original source code. This approach most likely results in binary code for the target system that is basically the same as if it had been generated directly out of the original source code.

According to one or more embodiments of the invention, the process is migrated without interruptions wherein the emulation of the process is stopped when executing said translated binary target application code on said target system is started. By migrating the process from the source system to the emulator of the target system and—later on—executing the process on target system in native mode, i.e. by using the translated binary application code, the process may be transferred to target system with zero downtime, i.e. no or at least no significant interruptions in execution of the process to be migrated.

According to one or more implementations of the invention, the information regarding the state of the source operating system correlated with the process to be migrated is identically pre-allocated in the context of the emulator process of target operating system before starting the emulator. For migrating the process it is essential to transfer certain operating system resources, e.g. process identifiers, page table setup, file descriptors, System V IPC resources, etc. defining the state of the source operating system into the context of the target operating system. After pre-allocating the resources identically, the process running in the emulator can immediately and directly use those resources.

According to one or more embodiments of the invention, information regarding the state of the source operating system is placed anywhere in the context of target operating system and accesses to those information are mapped dynamically from system resources in the context of source operating system to system resources in the context of target operating system.

According to certain embodiments of the invention, the steps of translating system calls and runtime library calls and translating said source application code are performed using a cascade of at least two system call translators, at least two runtime library translators, at least two emulators and/or at least two compilers. Thereby if there is a lack of a system call translator, a runtime library translator, an emulator and/or a compiler for a certain operating system/hardware combination, the migration may be realized by stacking at least two of those translators, emulators and compilers and, thus, enable the transformation of code, calls etc.

According to one or more embodiments of the invention, at least two unrelated processes from one source system are migrated to at least two target systems for splitting and/or distributing the computational load. Thereby it is possible to migrate the processes of a source system, which is intended to be shut down, to multiple target servers to minimize the workload which has to be taken over by the particular target servers.

According to certain embodiments of the invention, the translated binary target application code is cached and/or stored persistently in a repository of the target system. Thereby it can be reused, even after the shutdown of the target system. The translated binary target application code could also be transferred to another target system with the same operating system/hardware configuration for reusing it.

According to one or more implementations of the invention, the translated binary target application code is stored persistently in a central repository to be accessed by the source and target systems. The emulators and/or compilers may reuse the already translated target application code or parts of the translated target application code later on instead of performing the translation themselves.

According to one or more embodiments of the invention, the translation of source application code into binary target application code is performed by a central compilation entity. The central compilation entity may be adapted to translate code in a high parallel and very fast manner. The central compilation entity may be used to take over the whole compilation task of a target system. Alternatively, the central compilation entity may be used to pre-translate certain frequently used code parts and store the translated code within a repository. A target system may preload those pre-translated code parts form the repository before starting the migration. The final target application code may be built by using those pre-translated code parts, thus speeding up migration considerably.

According to certain embodiments of the invention, the semantics of execution of application code which was running on the source system before migration are compared with the semantics of execution of translated binary code after migration on the target system by using a checking entity. This guarantees that the translation of code and calls was correct and therefore the process was migrated properly.

In a further aspect, the invention relates to a computer-based system for migrating a process comprising at least a source system with a source operating system and a target system with a target operating system, wherein said source and target system and said source or target operating system are different, wherein the target system comprises:
- a target virtualization and migration component which is compatible to a source virtualization and migration component of the source system and which is adapted to receive migration trigger information sent by the source virtualization and migration component;
- an emulator which is adapted to emulate the source system by using the target system;
- a compiler which is adapted to translate source application code associated with a process executed on source system (S1) to binary target application code which is executable on the target system;
- a system call translator for translating system calls directed to the source operating system into system calls directed to the target operating system;
- a runtime library translator for translating calls directed to the runtime libraries of the source operating system into calls directed to the runtime libraries of the target operating system;

wherein the system is adapted to:
- a migration of the at least one process by using said source and target virtualization and migration component;
- allocate virtual address space in the target system for said process to be migrated;
- copy the memory of virtual address space of the process to be migrated to said allocated virtual address space of said target system;
- copy information regarding operating system state which is associated with said process to the target operating system;
- to execute the process to be migrated on said target operating system by means of said emulator, wherein said emulator is adapted to start executing the code associated with said process and to perform or initiate the following steps:
  - translate system calls and runtime library calls for source operating system associated with said process in system calls for said target operating system by means of said system call translator and in runtime library calls for said target operating system by means of said runtime library translator;
  - translate said source application code associated with the process to be migrated into binary target application code executable on said target system by means of said compiler if said source application code has not yet been translated; and
  - start executing said translated binary target application code on said target system.

The invention claimed is:

1. A computer-implemented method for migrating of at least one process from a source system with a source operating system to a target system with a target operating system, wherein the source and target system or the source and target operating system are different, the method comprising:
   - starting migration of the at least one process using, at least in part, a target virtualization and migration component of the target system;
   - allocating virtual address space in the target system for the at least one process being migrated;
   - storing memory of virtual address space of the at least one process being migrated to the allocated virtual address space of the target system;
   - storing information regarding operating system state associated with the at least one process to the target operating system; and
   - executing the at least one process being migrated on the target operating system by means of an emulator adapted to emulate the source system, wherein the emulator starts executing source application code associated with the at least one process, and performs or initiates:
     - translating, at the target system, system calls and runtime library calls of the source operating system, associated with the at least one process to system calls for the target operating system, by means of a system call translator, and runtime library calls for the target operating system, by means of a runtime library translator;
     - translating, at the target system, the source application code associated with the at least one process being migrated into binary target application code executable on the target system by means of a compiler if the source application code has not yet been translated; and
     - executing the translated binary target application code (C2) on the target system.

2. The method of claim 1, wherein the translating system calls and runtime library calls and the translating the source application code are performed at the target system on demand.

3. The method of claim 1, wherein the compiler is a just-in-time compiler.

4. The method of claim 1, wherein the source application code to be com-piled by the compiler is one of binary machine code, a combination of binary machine code and intermediate code, or an intermediated code.

5. The method of claim 1, wherein the at least one process is migrated to the target system without interruptions, and wherein emulation of the at least one process is stopped when executing the translated binary target application code on the target system is started.

6. The method of claim 1, wherein the information regarding the state of the source operating system is identically pre-allocated in the context of the emulator process of the target operating system before starting the emulator.

7. The method of claim 1, wherein the information regarding the state of the source operating system is placed anywhere in the process context of the target operating system and accesses to the information is mapped dynamically, at the target system, from system resources in the context of source operating system to system resources in the context of the target operating system.

8. The method of claim 1, wherein the translating system calls and runtime library calls and the translating the source application code are performed using one or more of a cascade of at least two system call translators, a cascade of at least two runtime library translators, a cascade of at least two emulators, or a cascade of at least two compilers.

9. The method of claim 1, further comprising migrating at least two unrelated processes from the source system to at least two target systems for splitting and/or distributing computational load.

10. The method of claim 1, wherein the translated binary target application code is cached and/or stored persistently in a repository of the target system.

11. The method of claim 1, wherein the translated binary target application code is stored persistently in a central repository accessible by the source system and the target system.

12. The method of claim 1, wherein the translation of source application code into binary target application code comprises receiving of the target system at least part of the translated binary application code from a central compilation entity.

13. The method of claim 1, further comprising checking semantics of execution of application code which was running on the source system before migration compared with semantics of execution of translated binary code after migration on the target system.

14. A computer-based system for migrating at least one process from a source system with a source operating system to a target system with a target operating system, where the source and target system, or the source and target operating system are different types of systems or operating systems, respectively, and the target system comprises, at least in part, the computer-based system, including: a processor
 a target virtualization and migration component which is compatible to a source virtualization and migration component of the source system and which receives migration trigger information;
 an emulator which emulates the source system by using the target system;
 a compiler to translate source application code associated with the at least one process for executing on the source system, to binary target application code executable on the target system;
 a system call translator for translating system calls of the source operating system into system calls of the target operating system; and
 a runtime library translator for translating calls of the runtime libraries of the source operating system into calls of the runtime libraries of the target operating system;
wherein the computer-based system:
 migrates the at least one process using, at least in part, the target virtualization and migration component;
 allocates virtual address space in the target system for the at least one process being migrated;
 stores memory of virtual address space associated with the at least one process being migrated to the allocated virtual address space of the target system;
 stores information regarding operating system state associated with the at least one process to the target operating system; and
 executes the at least one process being migrated on the target operating system by means of the emulator, wherein the emulator starts executing source application code associated with the at least one process, and performs or initiates:
  translating, at the target system, system calls and runtime library calls of the source operating system associated with the at least one process to system calls for the target operating system, by means of the system call translator and runtime library calls for the target operating system by means of the runtime library translator;
  translating, at the target system, the source application code associated with the at least one process being migrated into binary target application code executable on the target system by means of the compiler if the source application code has not yet been translated; and executing the translated binary target application code on the target system.

15. The computer-based system of claim 14, wherein the translating system calls and runtime library calls and the translating the source application code are performed at the target system on demand.

16. The computer-based system of claim 14, wherein the compiler is a just-in-time compiler.

17. The computer-bases system of claim 14, wherein the source application code to be compiled by the compiler is one of binary machine code, a combination of binary machine code and intermediate code, or an intermediated code.

18. The computer-based system of claim 14, wherein the at least one process running on the source system is migrated to the target system without interruptions, and wherein emulation of the at least one process is stopped when executing the translated binary target application code on the target system is started.

19. The computer-based system of claim 14, wherein the information regarding the state of the source operating system is identically pre-allocated in the context of the emulator process of the target operating system before starting the emulator.

20. A computer program product for migrating at least one process from a source system with a source operating system to a target system with a target operating system, where at least one of the source and target system or the source and target operating system are different types of systems or operating systems, respectively, the computer program product comprising:
 a non-transitory computer-readable storage medium readable by a processor and storing instructions for execution by the processor for performing a method comprising:
  starting migration of the at least one process using, at least in part, a target virtualization and migration component of the target system;
  allocating virtual address space in the target system for the at least one process being migrated;
  storing memory of virtual address space of the at least one process being migrated to the allocated virtual address space of the target system;
  storing information regarding operating system state associated with the at least one process to the target operating system; and
  executing the at least one process being migrated on the target operating system by means of an emulator adapted to emulate the source system, wherein the emulator starts executing source application code associated with the at least one process, and performs or initiates:
   translating, at the target system, system calls and runtime library calls of the source operating system associated with the at least one process to system calls for the target operating system, by means of a system call translator, and runtime library calls for the target operating system, by means of a runtime library translator;
   translating, at the target system, the source application code associated with the at least one process being migrated into binary target application code executable on the target system by means of a compiler if the source application code has not yet been translated; and executing the translated binary target application code on the target system.

\* \* \* \* \*